United States Patent

[11] 3,575,575

[72] Inventor David W. Kean
19687 Gary Ave., Sunnyvale, Calif. 94086
[21] Appl. No. 789,223
[22] Filed Jan. 6, 1969
[45] Patented Apr. 20, 1971

[54] TAPE AND TAPE TRANSPORT PROVIDING DISTANCE SYNCHRONIZED MESSAGES
6 Claims, 1 Drawing Fig.

[52] U.S. Cl. .......... 179/100.1, 179/100.2
[51] Int. Cl. .......... G11b 15/28, 15/28, G11b 15/46, G11b 31/00
[50] Field of Search .......... 179/100.25, 100.1 (PS), 100.1 (S), 100.2 (X), 2 (R), 100.1 (VC), (VEH)

[56] References Cited
UNITED STATES PATENTS

| | | | |
|---|---|---|---|
| 3,024,320 | 3/1962 | Nye | 179/100.2 |
| 2,965,720 | 12/1960 | Bumstead | 179/100.2 |
| 2,501,048 | 3/1950 | Hallen | 179/100.1 |
| 3,493,692 | 2/1970 | Jones | 179/100.1 |
| 3,341,833 | 9/1967 | Jones | 179/100.1X |

*Primary Examiner*—Bernard Konick
*Assistant Examiner*—Raymond F. Cardillo, Jr.
*Attorney*—Townsend & Townsend

ABSTRACT: A vehicle-mounted tape transport adapted to play a single tape having sequential messages, each message beginning at preselected points along a designated route of vehicle travel.

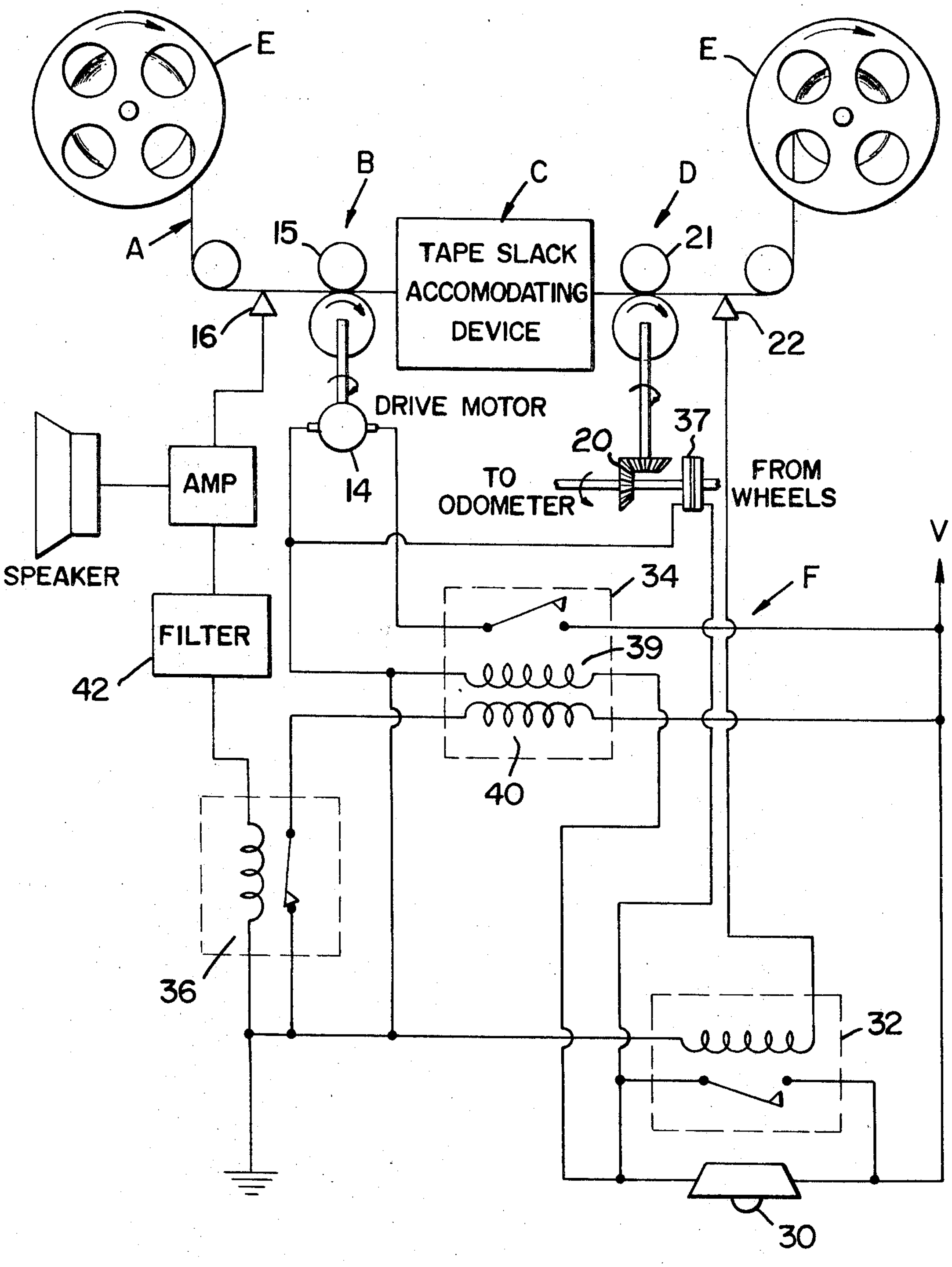
INVENTOR.
DAVID W. KEAN
BY
Townsend and Townsend
ATTORNEYS

TAPE AND TAPE TRANSPORT PROVIDING DISTANCE SYNCHRONIZED MESSAGES

This invention relates to an audio playback transport mechanism which is keyed to the motion of a vehicle. This mechanism permits prerecorded spoken commentary, travel directions or other signals, to be played back to the occupants of a vehicle in rough synchronization with the distance of vehicle travel.

Remote tape mechanism which broadcast prerecorded spoken commentaries, travel directions or other signals, to vehicles traveling along a designated route are highly desirable. These mechanisms enable the driver and occupants of the vehicle to devote full attention to their travel without the necessity of referring to signs or stopping to read directions.

The coupling of a sequence of tape recorded messages to the motion of a vehicle has heretofore required two separate memory devices. One memory device sensitive to the motion of the vehicle is driven intermittently as the vehicle proceeds at corresponding intermittent and varied speeds over the designated route. This memory device furnishes a start signal whenever the vehicle travels a preselected distance and a sequential message is desired. The other memory device, typically a recorded tape and playback, receives the starting signal and is driven at a constant speed so as to actively translate the sequential prerecorded commentary at the selected points along the route. Unfortunately, the requirement of two separate memory devices has complicated such remote recorder mechanisms to the point where they cannot practically be manufactured and used.

It is an object of this invention to provide a vehicle mounted tape transport using a single prerecorded tape or memory device for the delivery of sequential messages at preselected points along a designated route of vehicle travel. Accordingly, the single tape is passed through a tape transport having a pair of spaced tape reels adapted to supply tape at one end of the transport and take up tape at the other end of the transport. A tape slack accommodating device is placed between the reels and adapted to provide buffer storage of varied lengths of tape accumulated between the two reels. A first tape playback, sensitive to the movement of the vehicle over the route, plays the tape in proportion to the intermittent movement of the vehicle along the designated route. This tape transport reads starting signals spaced at respective distances along the tape in proportion to the respective distances between the points at which the tape is desired to be played, and transmits a starting signal when the vehicle reaches such points. A second tape playback is constructed to play the tape at a constant speed and actively translate prerecorded spoken commentary on the tape when it receives a starting signal from the first playback. The respective playbacks draw tape from and supply tape to the buffer storage between the tape reels, permitting reading of a single tape played at two differing rates.

A feature and advantage of this invention is that a single tape or memory device contains both the prerecorded messages and the start-stop information.

A further advantage of this invention is the fact that the device is self-recording in that a vehicle can be driven over the selected route and recorded at its first playback with the start information and at its second playback with each sequential message.

An additional advantage of this invention is that the tape transport can be readily adapted to sequentially play messages corresponding to different routes by the simple expedient of feeding new prerecorded tapes into the machine.

A further advantage of this invention is that the tape transport machine can be installed to existing vehicles by the simple expedient of being coupled to the vehicle power supply at one point and the vehicle odometer at another point.

Other objects, features and advantages of the present invention will be more apparent after referring to the following specification and attached drawing in which:

The FIGURE is a schematic diagram of a tape transport according to this invention showing an attached schematic wiring diagram for actuating the start and stop functions in synchronization with vehicle movement.

With reference to the FIGURE, tape A is shown passing through the vehicle-mounted transport, including a first playback B, a tape slack-accommodator C and a second playback D. The tape is fed into the transport at one end and taken from the transport at the opposite end by conventional tape storage reels E.

In operation, playback D, coupled to the vehicle odometer, plays the tape at a rate synchronized to the distance of vehicle travel. This playback reads sequential starting signals contained along the length of the tape and furnishes starting information to playback B. Upon receiving starting information, playback B broadcasts in sequence messages corresponding to preselected points along a designated route, stopping at the end of each message.

Tape A is typically a prerecorded magnetic tape. This tape has disposed thereon sequential recorded messages, and start-stop information for each message. The tape has start information corresponding to each point along the designated route at which a message is desired to be played. This start information is separated by distances along the tape proportional to the actual distances separating the respective points along the designated vehicle route. The prerecorded messages are spaced from the start information so that when the start information is read at playback D, the message can be translated at playback B. At the end of each message the tape contains the stop information for playback B.

Playback B comprises a constant speed capstan drive 14 coupled to a capstan 15. Upon receiving power, drive 14 rotates capstan 15 so as to pass tape A over transducer 16 at a constant tape playback rate. Transducer 16, through its connected amplifier and speaker, broadcasts audibly a prerecorded spoken commentary to the vehicle occupants.

Playback D includes bevel gears 20 coupled to the odometer output of the vehicles. As the vehicle travels over the designated route, tape is played past a transducer 22. The tape is fed through the transport at a rate which is a preselected fraction of the rate of vehicle travel. This registers the sequential start information contained along tape A with transducer 22 when the vehicle travels a distance equal to the distance between the preselected points along the designated route.

In playing of the tape, the tape passes through playback B at a constant speed, this constant speed being necessary for audibly reproducing the recorded message thereon, and passes through playback D at various speeds coupled directly to the rate of vehicle travel. Since the rate of vehicle travel varies, tape slack accommodating device C is placed between playbacks B and D to accumulate and play out tape. A slack accommodating device suitable for use with this invention is disclosed in U.S. Pat. No. 3,295,427 of Robert A. Oswald, entitled FILM MAGAZINE.

Actuation of playback B from the starting information obtained at playback D occurs through circuitry F. Circuitry F includes transport start button 30, start solenoid 32, normally open capstan start solenoid 34, normally closed capstan stop solenoid 36, and a magnetic clutch 37, all of these elements being interconnected by wiring schematically shown in line diagram of the FIGURE.

Explanation of the operation of the solenoids may best be understood by specific example. Drive motor 14 of playback B is actuated by the closing of normally open capstan start solenoid 34. This closing is initially achieved by depressing transport start button 30 at the beginning of the selected route to close an open circuit between voltage source $V$ and ground through first capstan start winding 39. Upon completion of the circuit, solenoid 34 closes, supplying motive power to the capstan drive motor. When closed, second capstan hold winding 40 maintains solenoid 34 in the closed position. This winding has a continuous current received from voltage source $V$ at one end traveling through normally closed capstan stop solenoid 36 at the other end to ground.

Simultaneously with the closing of capstan start solenoid 34, a closing signal is communicated to magnetic clutch 37. This clutch upon receiving a single closing signal, actuates capstan 21 to play tape A with all movements of the vehicle. This clutch remains in the closed position until tape A is completely played.

Typically, stop information for each message is contained on tape A at the end of the message. This stop information, a nonaudible signal on the tape, is received from the transducer 16 and its connected amplifier and passed through tuned filter 42. Filter 42 transmits the stop signal to the winding of capstan stop solenoid 36. The winding receives a signal, opens the solenoid, and inhibits the flow of current through capstan hold winding 40. When the current is inhibited in this winding, solenoid 34 opens, stopping capstan drive motor 14 and the translation of any further recorded information on tape A.

When the vehicle to which the transport is mounted has traveled a distance equal to the known distance to the next preselected point along the designated route, playback D will register start information with transducer 22. This transducer will emanate an electrical signal through the winding of playback start solenoid 32, and then to ground. Solenoid 32 will close, closing in turn capstan start solenoid 34, and result in the next sequential message on tape A being broadcast through the speaker.

It will be apparent that transducer 16 can be any transducer capable of translating recorded information from a tape and audibly broadcasting such information. Likewise, transducer 22 can be any mechanism capable of recognizing the start indicia placed at the selected intervals along tape A. Transducer 22 could, for instance, be adapted to recognize a notch or hole along tape A or alternately could recognize colorations along the tape as the respective starting signals. Likewise, the illustrated electrical circuitry F could be altered to any configuration suitable for receiving start information at one point, playing a prerecorded commentary at another point, and stopping at the end of such commentary. Further, it will be obvious that the positions of playbacks B and D relative to tape slack accommodating device C could be reversed. Similarly, many alternate embodiments of this invention can be made for the purpose of reading tape A.

It can readily be seen that the transport of this invention can be adapted to record as well as play tape A. This modification can be made by providing recording transducers at 16 and 22. Thereafter, a vehicle can be driven over the preselected route, the messages recorded at the selected distance space points, providing a recorded tape A.

I claim:

1. A device for vehicles adapted to play recorded messages at preselected distance intervals of travel by said vehicle comprising: a recording tape; a pair of spaced tape reels with one of said reels adapted to supply tape and another of said reels adapted to take up tape; a tape slack accommodating means adapted to store accumulated tape between said reels; a first tape drive means constructed to move tape between one of said tape reels and said tape slack accommodating means; a second tape drive means constructed to move tape between the other of said tape reels and said tape slack accommodating means; means sensitive to the distance traveled by said vehicle coupled to drive said first drive means; start signal indicia placed at preselected positions on said tape, start indicia reading means positioned to read said tape adjacent said first drive means operative to provide a start pulse, constant speed tape drive actuator means connected to operate said second tape drive means, a plurality of recorded messages on said recording tape, each message having after its termination a stop signal, tape reading means mounted to read said tape adjacent said second drive means, said actuator means responsive to said start pulses to cause said second tape drive means to start operation upon receipt of a start pulse, second tape drive deactuating means responsive to deactuate said second tape drive means upon receipt of a stop pulse read by said tape reading means.

2. The invention of claim 1 and wherein said means sensitive to the distance traveled by said vehicle is coupled to the vehicle odometer.

3. The invention of claim 1 and wherein said prerecorded tape is gathered to said tape slack accumulation means from said second tape drive means and is gathered from said tape slack accumulation means by said fist tape drive means.

4. The invention of claim 1 and wherein said second playback includes means for actuating said first prerecorded sequential message.

5. A vehicle-mounted tape transport for playing a single tape having sequential recorded messages and start information synchronized to preselected points along a designated route, said transport comprising: first and second tape playbacks for passing said tape therethrough; a tape storage means between said first and second tape playbacks; first tape moving means for passing said tape through said first transport at a rate proportional to the velocity of vehicle travel; second tape moving means for passing said tape through said second playback at a rate to produce an audio reproduction of the prerecorded message on said tape; and, means on said first playback interconnected to said second playback for actuating said second playback when said first playback reads start information disposed on said tape.

6. The invention of claim 5 and wherein said first tape moving means includes means for coupling said moving means to the odometer of said vehicle.